US 8,458,316 B2

(12) United States Patent
Kurahashi (10) Patent No.: US 8,458,316 B2
(45) Date of Patent: Jun. 4, 2013

(54) MANAGEMENT APPARATUS, CONTROL METHOD THEREOF AND INFORMATION PROCESSING SYSTEM

(75) Inventor: Yuichi Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/214,732

(22) Filed: Aug. 22, 2011

(65) Prior Publication Data
US 2012/0072586 A1    Mar. 22, 2012

(30) Foreign Application Priority Data
Sep. 17, 2010 (JP) ................................. 2010-209885

(51) Int. Cl.
*G06F 15/173* (2006.01)
(52) U.S. Cl.
USPC ......................................... 709/223; 709/203
(58) Field of Classification Search
USPC .. 709/203, 223; 707/781; 711/100; 358/1.13, 358/1.15; 370/400
See application file for complete search history.

(56) References Cited

U.S. PATENT DOCUMENTS

| 7,362,458 | B2* | 4/2008 | Adachi | 358/1.15 |
| 7,571,248 | B2* | 8/2009 | Kutsumi et al. | 709/238 |
| 7,602,725 | B2* | 10/2009 | Vaught | 370/236.2 |
| 2011/0289296 | A1* | 11/2011 | Saito et al. | 711/209 |

FOREIGN PATENT DOCUMENTS
JP    2000-209424 A    7/2000

* cited by examiner

*Primary Examiner* — Frantz Jean
(74) *Attorney, Agent, or Firm* — Fitzpatrick, Cella, Harper & Scinto (57) ABSTRACT

In order to efficiently manage the operating information of a network device while maintaining the accuracy, a management apparatus that acquires operating information from a network device and manages an operating history, the apparatus comprises a storage unit that stores a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier.

7 Claims, 7 Drawing Sheets

| DEPARTMENT ID | INITIAL RECEIVING DATE | FINAL RECEIVING DATE |
|---|---|---|
| 0001 | 2009/01/01 | 2010/02/25 |
| 0002 | 2009/01/01 | 2009/09/30 |
| 0003 | 2009/04/01 | 2009/09/30 |
| 0004 | 2009/04/01 | 2010/02/25 |
| 0005 | 2009/04/01 | 2010/02/25 |
| ⋮ | ⋮ | ⋮ |
| 0600 | 2010/01/01 | 2010/02/25 |

FIG. 5

| DEPARTMENT ID | TOTAL COUNTER | MONOCHROME PRINT | COLOR PRINT |
|---|---|---|---|
| 0001 | 10800 | 6100 | 4700 |
| 0004 | 0 | 0 | 0 |
| 0005 | 2400 | 850 | 1520 |
| ⋮ | ⋮ | ⋮ | ⋮ |
| 0600 | 400 | 100 | 300 |

| DEPARTMENT ID | TOTAL COUNTER | MONOCHROME PRINT | COLOR PRINT |
|---|---|---|---|
| 0001 | 10850 | 6120 | 4730 |
| 0004 | 0 | 0 | 0 |
| 0005 | 2420 | 850 | 1540 |
| ⋮ | ⋮ | ⋮ | ⋮ |
| 0600 | 400 | 100 | 300 |

F I G. 6

| RECEIVING DATE | DEPARTMENT ID | TOTAL COUNTER | MONOCHROME PRINT | COLOR PRINT |
|---|---|---|---|---|
| 2009/09/30 | 0001 | 80 | 50 | 30 |
| 2009/09/30 | 0002 | 100 | 60 | 40 |
| 2009/09/30 | 0005 | 15 | 5 | 10 |
| ⋮ | ⋮ | ⋮ | ⋮ | ⋮ |
| ⋮ | ⋮ | ⋮ | ⋮ | ⋮ |
| 2010/02/24 | 0001 | 120 | 70 | 50 |
| ⋮ | ⋮ | ⋮ | ⋮ | ⋮ |
| 2010/02/24 | 0600 | 10 | 0 | 10 |
| 2010/02/25 | 0001 | 50 | 20 | 30 |
| 2010/02/25 | 0005 | 20 | 0 | 20 |
| ⋮ | ⋮ | ⋮ | ⋮ | ⋮ |

| DEPARTMENT ID | TOTAL COUNTER | MONOCHROME PRINT | COLOR PRINT |
|---|---|---|---|
| 0001 | 170 | 90 | 80 |
| 0004 | 0 | 0 | 0 |
| 0005 | 20 | 0 | 20 |
| ⋮ | ⋮ | ⋮ | ⋮ |
| 0600 | 10 | 0 | 10 |

MANAGEMENT APPARATUS, CONTROL METHOD THEREOF AND INFORMATION PROCESSING SYSTEM

BACKGROUND OF THE INVENTION

1. Field of the Invention

The present invention relates to a technique for managing the operating status of a device connected to a network.

2. Description of the Related Art

There are systems that manage the operating status of a network device, such as an image forming apparatus equipped with a communication control apparatus, from a remote place. In such systems, a plurality of network devices and a management apparatus for managing network devices are connected to each other via a local area network (LAN), a wide area network (WAN) or the Internet. Each network device transmits its trouble information and operating information such as function usage frequency (counter information indicating the number of uses of a functionality) to the management apparatus. For example, the function usage frequency or the like is transmitted at regular intervals. The management apparatus is configured to accumulate the received operating information and manage the information as a history so that the network device operating information accumulated for a given period of time spanning from the past to the present can be referenced and analyzed.

There are cases where a single network device is shared by a plurality of departments (users or user groups). In order to manage the status of use for each department, a network device has been proposed in, for example, Japanese Patent Laid-Open No. 2000-209424, in which department information is set in the network device, and the function usage frequency is recorded for each department. Furthermore, the network device is configured to be capable of transmitting function usage frequency per department to the management apparatus at a regular interval.

Furthermore, in the case where a plurality of network devices are used in the same environment and are shared by a plurality of departments, due to setting efficiency considerations, department settings are often commonly set in the network devices. It is often the case that each department usually uses only a few of the network devices, and thus a situation in which the individual network devices include infrequently used department information can arise. In this case, in some of the network devices, the function usage frequency information per department remains almost the same over several months. That is, the management apparatus receives such function usage frequency information per department that remains almost the same as well as from each network device at a regular interval and manages the information as a history.

Department information set in each network device is not fixed in the network device, and the administrator of the network device can perform addition and deletion at a later time. Accordingly, if the management apparatus simply discards the department information whose function usage frequency remains the same in order to efficiently accumulate a large amount of information, the following problems can occur.

For example, when tallying up the usage frequency information for a certain period of time, it is not possible to make a distinction, from the tally results, between "department that does not exist in the network device (that is to be added or has been deleted)" and "department that exists in the network device but was not accumulated in the storage area because the information remains the same". Accordingly, tally results that correctly reflect the department information set in the network device cannot be output, and as a result, the administrator or the like of the network device cannot obtain the correct status.

The present invention provides a technique for efficiently managing the operating status per department of a network device while maintaining the accuracy.

SUMMARY OF THE INVENTION

According to one aspect of the present invention, a management apparatus that acquires operating information from a network device and manages an operating history, the apparatus comprises: a determining unit that determines whether the operating information acquired from the network device is usage frequency information for each identifier associated with a user who uses the network device, the usage frequency information being information regarding a function of the network device; a storage unit that stores a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier; an update unit that, when it is determined by the determining unit that the operating information is the usage frequency information per identifier, updates the first table and the third table using the usage frequency information per identifier and the information indicating the time when the usage frequency information was acquired; a receiving unit that receives a request to acquire information for a designated tally period; a tally unit that, in response to the acquisition request, tallies up a usage frequency per identifier during the tally period based on the first table and the third table; and an output unit that outputs tally results obtained by the tally unit, wherein in a case where new usage frequency information per identifier is acquired from the network device, the update unit compares the acquired usage frequency information with the previously acquired usage frequency information per identifier stored in the second table, and performs update by storing, in the third table, usage frequency information of an identifier whose usage frequency has been changed without storing information regarding an identifier whose usage frequency remains the same, and even in a case where information regarding an identifier whose usage frequency information has been acquired during the tally period is not stored in the third table with reference to the first table, the tally unit performs tallying so as to include the information regarding the identifier in the tally results.

According to another aspect of the present invention, a method of controlling a management apparatus that acquires operating information from a network device and manages an operating history, the method comprises: determining whether the operating information acquired from the network device is usage frequency information for each identifier associated with a user who uses the network device, the usage frequency information being information regarding a function of the network device; storing a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier; updating, when it is determined in the determining step that the operating information is the usage frequency information per identifier, the first table and the third table using the usage frequency information per identifier and the information indicating the time when the usage frequency information was acquired; receiving a request to acquire information for a designated tally period; tallying up, in response to the acquisition request, a usage frequency per identifier during the tally period based on the first table and the third table; and outputting tally results obtained in the tally step, wherein in the update step, in a case where new usage frequency information per identifier is acquired from the network device, the acquired usage frequency information is compared with the previously acquired usage frequency information per identifier stored in the second table, and update is performed by storing, in the third table, usage frequency information of an identifier whose usage frequency has been changed without storing information regarding an identifier whose usage frequency remains the same, and in the tally step, even in a case where information regarding an identifier whose usage frequency information has been acquired during the tally period is not stored in the third table with reference to the first table, tallying is performed so as to include the information regarding the identifier in the tally results.

According to still another aspect of the present invention, an information processing system including a network device, a management apparatus that manages operating information acquired from the network device, and a user apparatus that requests information managed by the management apparatus, the network device comprising a transmitting unit that transmits operating information to the management apparatus, the management apparatus comprising: a determining unit that determines whether the operating information acquired from the network device is usage frequency information for each identifier associated with a user who uses the network device, the usage frequency information being information regarding a function of the network device; a storage unit that stores a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier; and an update unit that, when it is determined by the determining unit that the operating information is the usage frequency information per identifier, updates the first table and the third table using the usage frequency information per identifier and the information indicating the time when the usage frequency information was acquired, and the user apparatus comprising: a request unit that makes a request to acquire information for a designated tally period to the management apparatus; and a display unit that, in response to the acquisition request, acquires and displays results obtained from the management apparatus tallying up the usage frequency per identifier during the tally period based on the first table and the third table, wherein in a case where new usage frequency information per identifier is acquired from the network device, the update unit compares the acquired usage frequency information with the previously acquired usage frequency information per identifier stored in the second table, and performs update by storing, in the third table, usage frequency information of an identifier whose usage frequency has been changed without storing information regarding to an identifier whose usage frequency remains the same, and even in a case where information regarding an identifier whose usage frequency information has been acquired during the tally period is not stored in the third table with reference to the first table, the management apparatus performs tallying so as to include the information regarding the identifier in the tally results.

According to the present invention, it is possible to provide a technique for efficiently managing the operating status per department of a network device while maintaining the accuracy.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, preferred embodiments of the present invention will be described in detail with reference to the drawings. It is to be understood that the embodiments given below are merely examples and are not intended to limit the scope of the present invention.

First Embodiment

A first embodiment of an information processing system according to the present invention will be described below taking an information processing system that manages operating information of a network device as an example.

System Configuration

Figure 1:
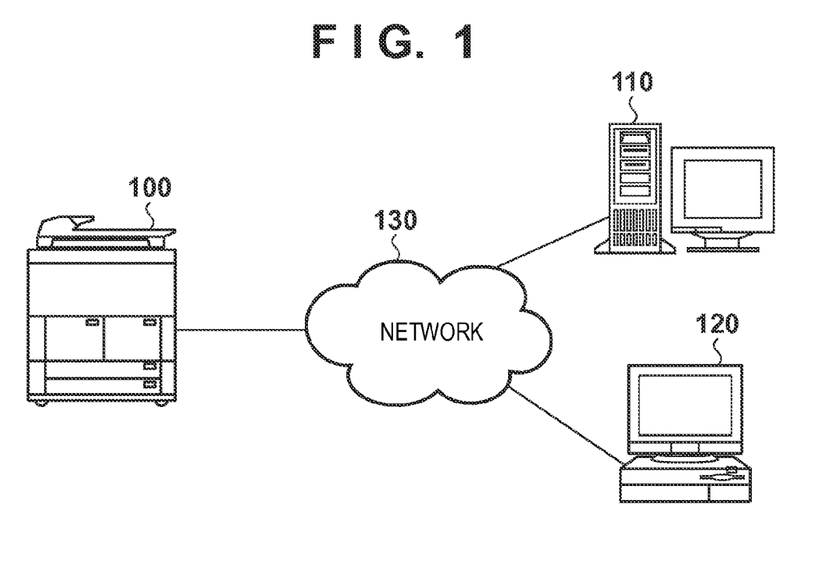
FIG. 1 is an overall schematic diagram of an information processing system.

FIG. 1 is an overall diagram of an information processing system according to the first embodiment of the present invention. A network device 100, a management apparatus 110 and a display apparatus 120 are connected to each other via a network 130. The following description will be given assuming that the network device 100 is an image forming apparatus such as a multifunction peripheral (MFP), but the present invention is not limited thereto. Also, in order to simplify the description, a single network device 100 will be used in the following description, but the information processing system may include a plurality of network devices.

The network device 100 stores its operating information in a storage unit provided in the network device 100. The operating information includes function usage frequency information on a department by department basis (on a user by user basis or on a user group by user group basis) set in the network device 100. The operating information also includes information that is not managed on a department by department basis such as the usage frequency of a consumable item of the network device.

The management apparatus 110 receives the operating information of the network device 100 either directly from the network device 100 or via an intermediary apparatus (not shown), and accumulates and manages the information as an operating history. As described above, the operating information received by the management apparatus 110 includes the function usage frequency information of the network device 100 on a department by department basis. The display apparatus 120 is an apparatus for displaying the operating information accumulated in the management apparatus 110 for the user to browse, and displays the operating information acquired from the management apparatus 110. The network 130 can be a LAN, a WAN, the Internet or the like, and may be wired or wireless as long as communication is possible between the devices.

Figure 2:
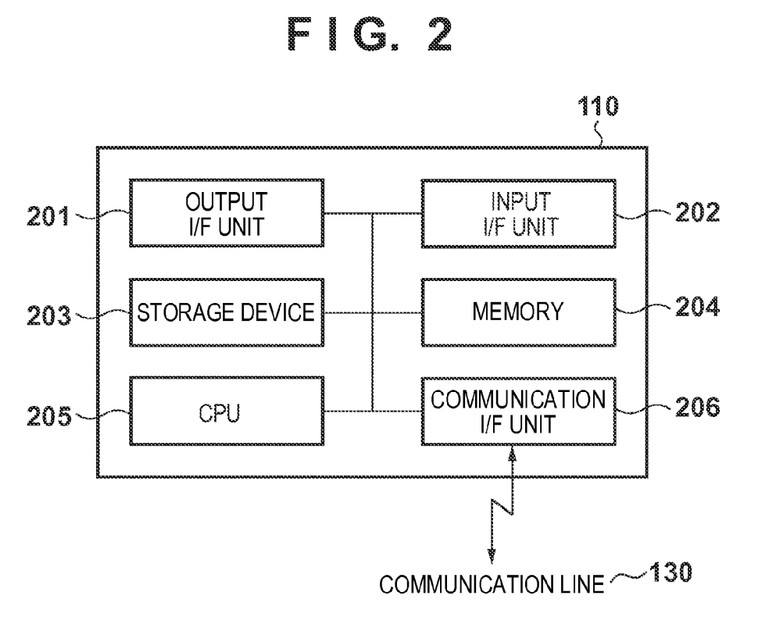
FIG. 2 is a diagram showing a hardware configuration of a management apparatus.

FIG. 2 is a diagram showing a hardware configuration of the management apparatus 110 of the first embodiment. The management apparatus 110 includes an output I/F unit 201 connected to an output device such as a display, an input I/F unit 202 connected to an input device such as a keyboard, a storage device 203, a memory 204, a CPU 205, and a communication I/F unit 206.

The storage device 203 stores, for example, an operating system (OS), a management program for managing operating history information of the network device 100, operating information received from the network device 100 and the like. The CPU 205 loads a program from the storage device 203 into the memory 204 and executes the program. The communication I/F unit 206 is connected to the network 130 so as to receive the operating information of the network device 100 and transmit the operating information of the network device 100 to the display apparatus 120.

Figure 3:
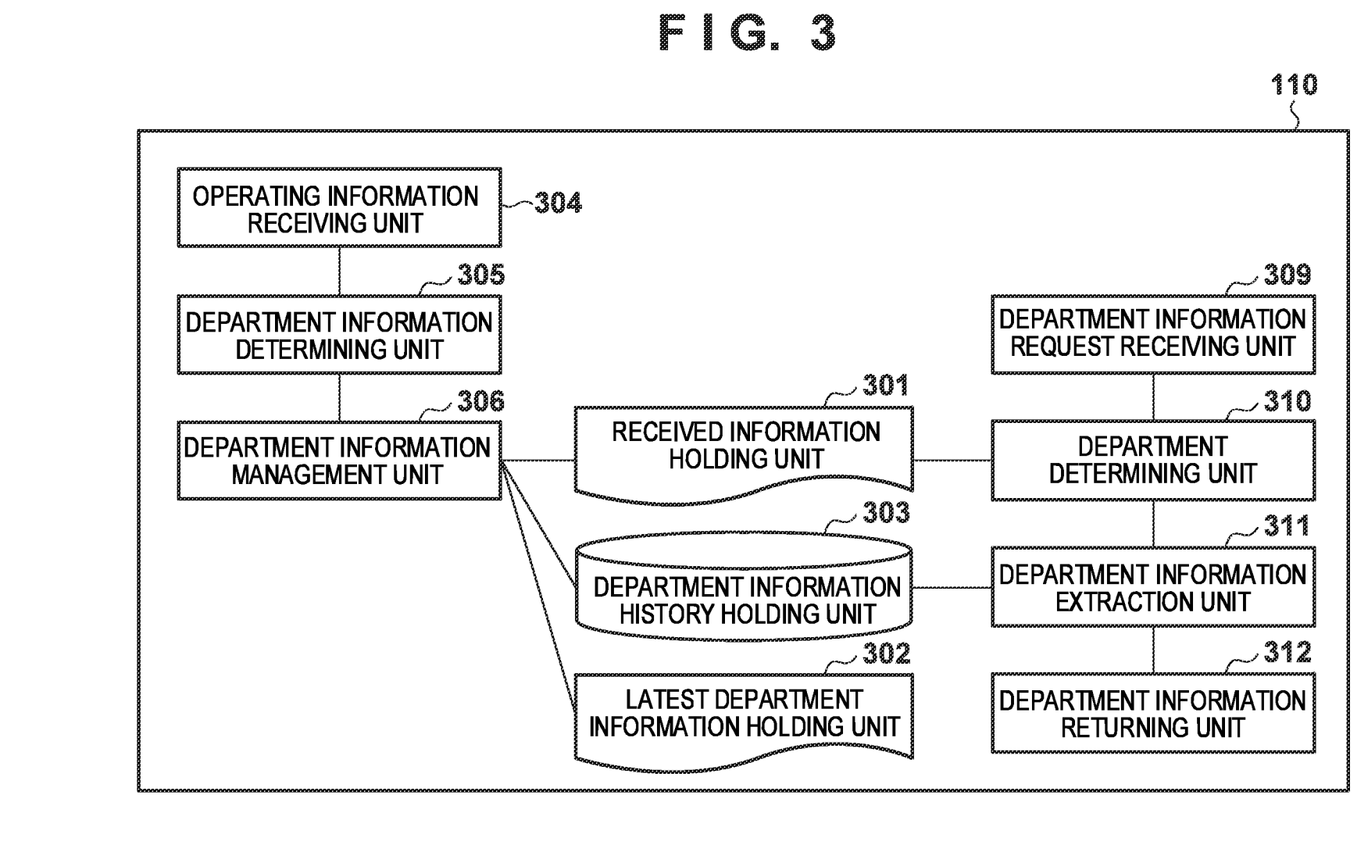
FIG. 3 is a functional block diagram of the management apparatus.

FIG. 3 is a diagram showing functional blocks of the management apparatus 110 that are relevant to the present invention. Specifically, FIG. 3 shows functions of receiving and managing the function usage frequency information per department received from the network device. A detailed description of other operating information received from the network device will not be given here, but such information is also stored in the storage device such that the information can be referenced. Each functional unit is implemented by the CPU 205 executing a program stored in the storage device 203.

A received information holding unit 301 holds temporal information, regarding the initial receiving date and the final (latest) receiving date of the function usage frequency information per department, of the function usage frequency information of the network device 100 on a department by department basis received by the management apparatus 110. The information held by the received information holding unit 301 will be described later in detail with reference to FIG. 4.

A latest department information holding unit 302 holds and manages latest function usage frequency information of the network device 100 on a department by department basis in the form of a department information table. The information held by the latest department information holding unit 302 will be described later in detail with reference to FIG. 5. A department information history holding unit 303 holds a history of the received function usage frequency information on a department by department basis. The information held by the department information history holding unit 303 will be described later in detail with reference to FIG. 6.

An operating information receiving unit 304 receives the operating information of the network device 100 via the communication I/F unit 206. A department information determining unit 305 determines whether or not the received operating information is function usage frequency information on a department by department basis.

A department information management unit 306 stores information in the received information holding unit 301, the latest department information holding unit 302 or the department information history holding unit 303, and updates the information.

A department information request receiving unit 309 receives a request to tally up the function usage frequency information on a department by department basis for a given period of time via the communication I/F unit 206. A department determining unit 310 determines a department for which the tally is to be performed for a designated period of time based on the information held in the received information holding unit 301. A department information extraction unit 311 extracts the function usage frequency information of the department for which the tally is to be performed from the department information history holding unit 303. A department information returning unit 312 transmits the tally results of the function usage frequency information on a department by department basis to the request source that requested the department information via the communication I/F unit 206.

Configuration of Table Storing Information

Figure 4:
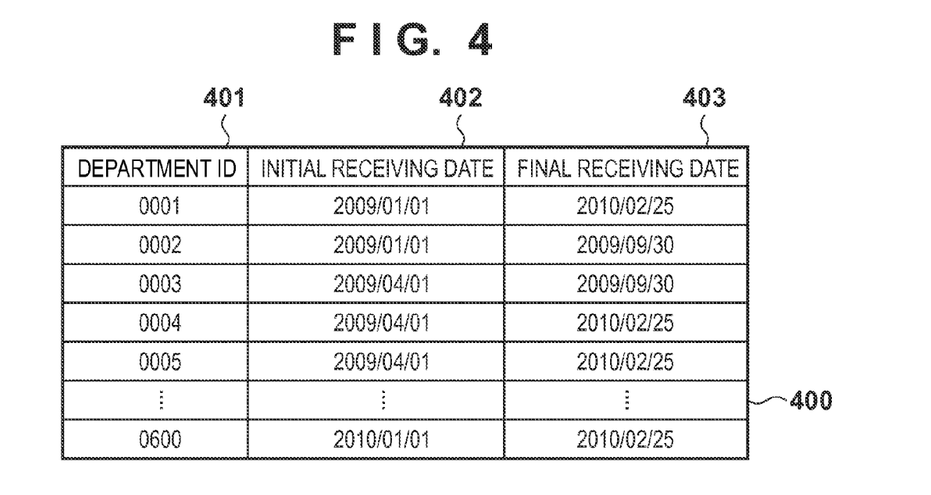
FIG. 4 is a diagram illustrating a reception management table.

FIG. 4 is a diagram showing an example of a reception management table 400 held in the received information holding unit 301. The reception management table 400 (a first table) stores information per department of the network device 100 (one record for one department). Department ID 401 indicates ID information (identifier) for uniquely identifying a department.

Initial receiving date 402 is a field for recording the date (a first time) on which the function usage frequency information per department was first received from the network device 100. For example, in FIG. 4, it can be seen that the function usage frequency information of a department ID "0001" was first received on Jan. 1, 2009 (2009/01/01). Final receiving date 403 is a field for recording the date (a second time) on which the function usage frequency information per department was last received.

In FIG. 4, date-based information is stored as the temporal information regarding the initial receiving date and the final receiving date, but time-based information (hour, minute, second and so on) may be included. It is also possible to use temporal information set by the transmission side (the network device 100), rather than by the reception side (the management apparatus 110).

Figure 5:
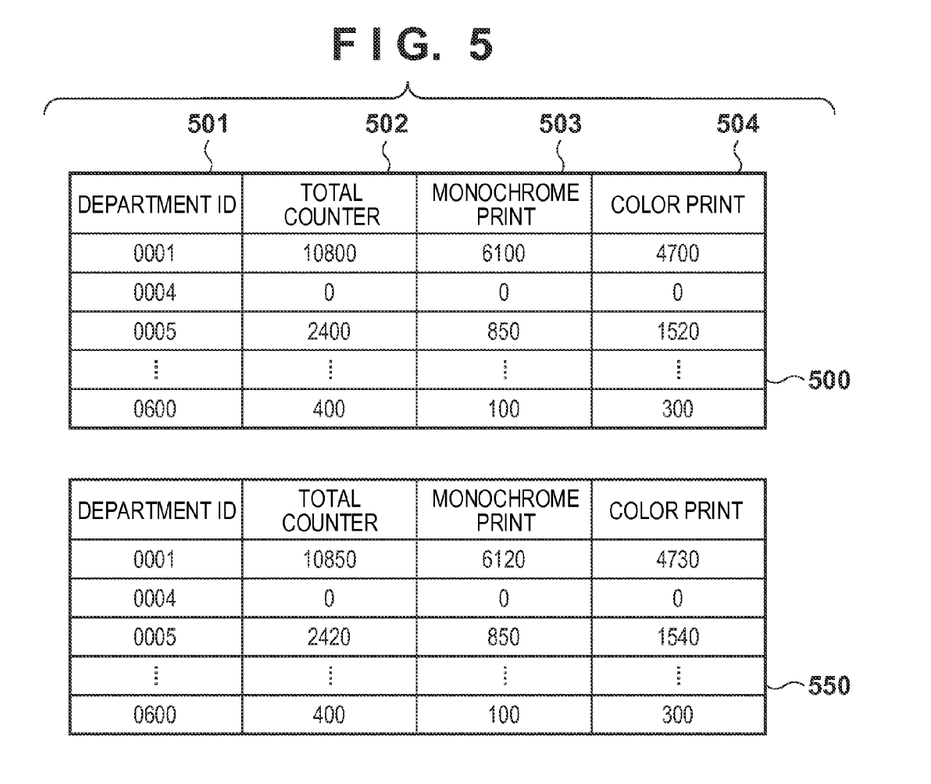
FIG. 5 is a diagram illustrating department information tables.

FIG. 5 shows department information tables (a second table) for storing the function usage frequency information on a department by department basis received by the operating information receiving unit 304. Specifically, a department information table 500 shows an example of function usage frequency information on a department by department basis received on Feb. 24, 2010 (2010/02/24), and a department information table 550 shows an example of function usage frequency information on a department by department basis received on Feb. 25, 2010 (2010/02/25). The function usage frequency information on a department by department basis contained in the operating information received by the operating information receiving unit 304 is temporality held in the latest department information holding unit 302 as a department information table before it is stored in the department information history holding unit 303, which will be described later with reference to FIG. 6.

Figure 6:
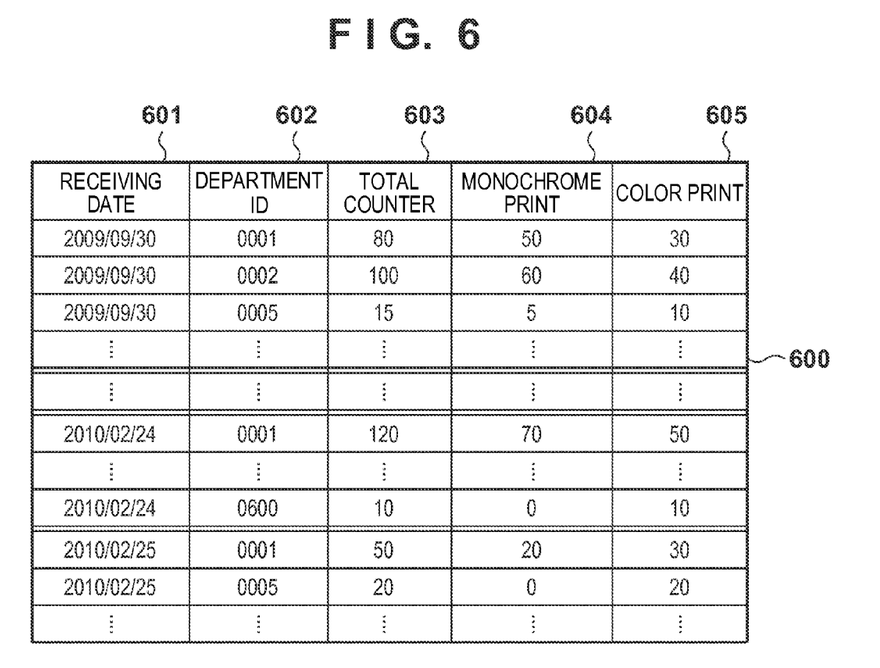
FIG. 6 is a diagram showing an example of a department information history table held in a department information history holding unit.

After necessary information contained in the function usage frequency information on a department by department basis has been stored in the department information history holding unit 303, the previously received function usage frequency information held in the latest department information holding unit 302 as a department information table is cleared. The function usage frequency information on a department by department basis may be temporarily held in the latest department information holding unit 302 by overwriting the information that is managed in the department information table and is not to be used, each time the function usage frequency information on a department by department basis is received.

The department information table 500 shows the function usage frequency information on a department by department basis received by the operating information receiving unit 304 on Feb. 24, 2010 (2010/02/24). Department ID 501 indicates ID information for uniquely identifying a department that uses the network device 100 and has been set in the network device 100. Total counter 502, monochrome print 503 and color print 504 are function usage frequency information fields. In this example, the number of print copies consumed by the department identified by each department ID is written. In this example, usage frequencies are written in three categories: total counter, monochrome print and color print, but it is also possible to manage any other information (for example, FAX usage frequency, scan usage frequency or the like) as long as the information can be managed with count values. In other words, the number of uses of a function is stored for each identifier associated with the user or user group who used the function.

The department information table 550 shows the function usage frequency information on a department by department basis received by the operating information receiving unit 304 on Feb. 25, 2010 (2010/02/25). Information (department ID, total counter, monochrome print and color print) similar to that of the department information table 500 is managed.

FIG. 6 is a diagram showing an example of a department information history table 600 held in the department information history holding unit 303. The department information history table 600 (a third table) adds records on a department by department basis each time the function usage frequency information on a department by department basis is received, and accumulates the information as history information.

Receiving date 601 is a field for recording the date on which the function usage frequency information was received. Department ID 602 indicates ID information for uniquely identifying a department set in the network device 100. In this example, the ID information received on the same date is managed in ascending order. In the department information history table 600, a single record is uniquely identified by a pair of a receiving date 601 and a department ID 602. Total counter 603, monochrome print 604 and color print 605 are function usage frequency information fields. In the example shown in FIG. 6, the difference with the previous value of the function usage frequency information is stored in each of the total counter 603, the monochrome print 604 and the color print 605, but there will be no problem even if the received function usage frequency information is stored as is. In the case where differences are stored, a smaller amount of data can be stored as a history.

In the department information history table 600, the department information whose function usage frequency remains the same as that obtained previously is not registered. As illustrated in the example shown in FIG. 5, in the function usage frequency information received on Feb. 25, 2010 (2010/02/25), the usage frequencies of a department ID "0004" remain the same as those received previously. For this reason, in the example of the department information history table 600 shown in FIG. 6, no record regarding the department ID "0004" is included in the information registered on Feb. 25, 2010 (2010/02/25).

Operations of Management Apparatus

Figure 7:
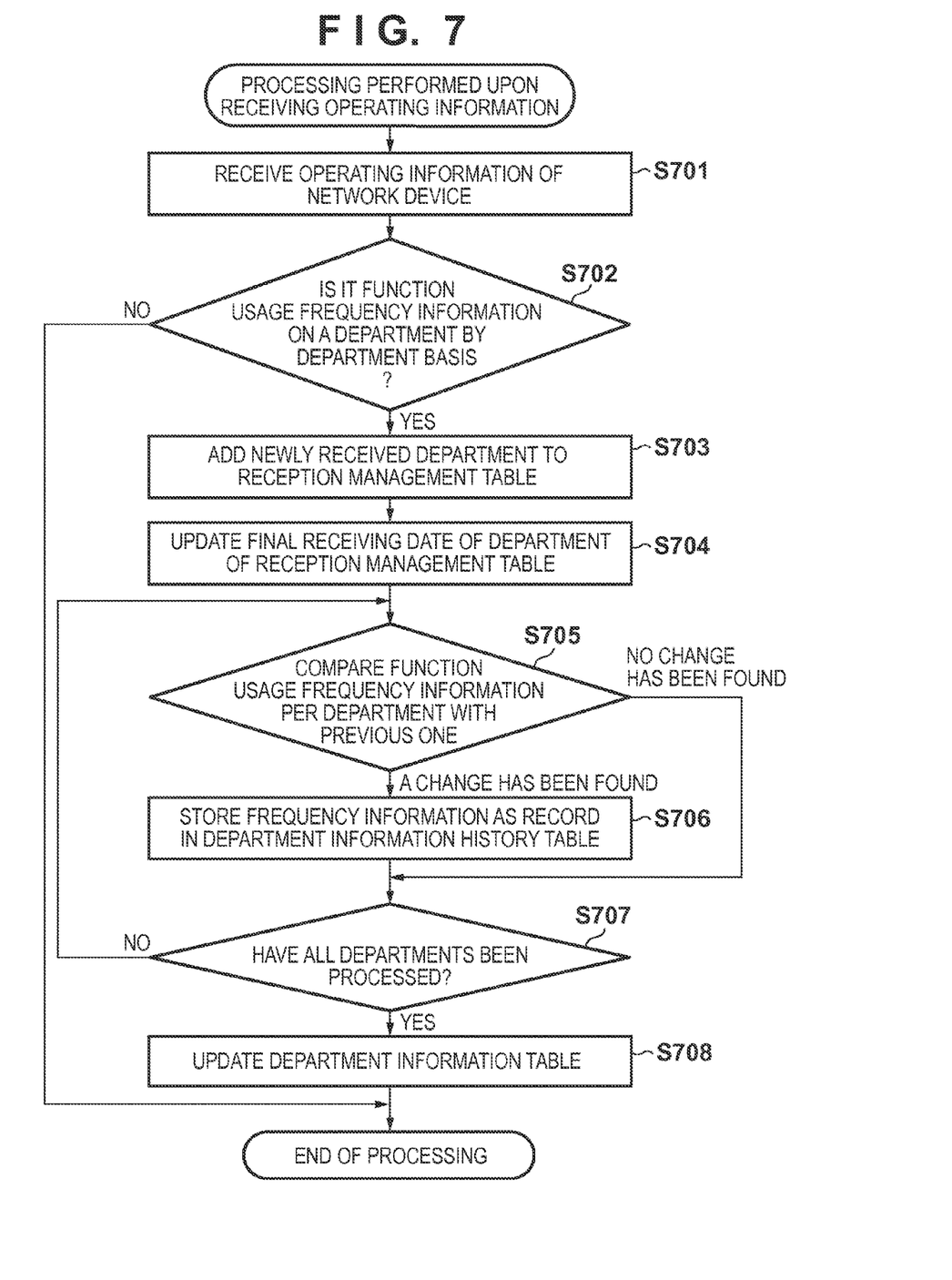
FIG. 7 is a flowchart illustrating processing performed by the management apparatus upon receiving operating information.

FIG. 7 is a flowchart illustrating a method of controlling the management apparatus 110 performed when the management apparatus 110 receives the operating information of the network device 100. The following description will be given assuming that the management apparatus 110 is holding, in the latest department information holding unit 302, the department information table 500 indicating the function usage frequency information received from the network device 100 at the previous collection timing, and that new function usage frequency information is to be received on Feb. 25, 2010 (2010/02/25) and held as the department information table 550 in the latest department information holding unit 302.

In step S701, the operating information receiving unit 304 receives the operating information of the network device 100. In this example, as a reception method, the operating information transmitted regularly from the network device 100 is received. Other than that, the operating information may be transmitted irregularly by the network device 100 in response to instructions from the administrator or the like.

In step S702, the department information determining unit 305 determines whether or not the received operating information is function usage frequency information on a department by department basis by checking the tag attached to the received operating information, the content of the operating information or the like. If it is determined that the received operating information is function usage frequency information on a department by department basis, the procedure advances to step S703. Otherwise, the process ends. For reference, in the case where operating information other than the function usage frequency information on a department by department basis is received, the management apparatus 110 manages the information by other appropriate methods such that the information can be referenced and analyzed.

In step S703, the department information management unit 306 compares the department IDs contained in the department information table 550 indicating the newly received function usage frequency information on a department by department basis with the department IDs 401 of the reception management table 400 held in the received information holding unit 301. If the department information table 550 includes a new department ID that does not exist in the department IDs 401, the department ID is determined to be a department newly set in the network device 100. The department information management unit 306 then adds the newly set department information to the reception management table 400. At this time, in the initial receiving date 402, the receiving date on which the function usage frequency information was received is recorded.

The determination of a new department described above may be performed as follows. For example, a new department may be determined by comparing the department IDs contained in the department information table 550 and the department IDs 501 of the department information table 500.

In step S704, the department information management unit 306 updates, with respect to all department IDs contained in the department information table 550, the final receiving dates 403 of the reception management table 400 to the receiving date information of the function usage frequency information on a department by department basis received in step S701.

In this example, the final receiving dates 403 of all department IDs contained in the department information table 550 are updated. However, it is also possible to use a configuration in which when it is detected that a department ID has been deleted, the final receiving date 403 of the deleted department ID 401 is updated as well.

Whether or not a department ID has been deleted can be detected by the department information management unit 306 comparing the department IDs contained in the department information table 550 with the department IDs 501 of the department information table 500 held in the latest department information holding unit 302. Specifically, if there is a department ID that exists in the department IDs 501 of the department information table 500 but does not exist in the department IDs of the department information table 550, it is determined that the department ID is the ID of a department that has been deleted from the settings of the network device 100. The department information management unit 306 updates the final receiving date 403 of the deleted department to the receiving date information on which the department information table 500 was received.

In steps S705 to S707 described below, the received operating information is accumulated. In step S705, the function usage frequency information per department contained in the department information table 550 is compared with the information in the function usage frequency information fields 502 to 504 of the department information table 500 so as to calculate difference values. If the difference values of the function usage frequencies calculated in step S705 are 0 (zero), the procedure advances to step S707.

If the difference values of the function usage frequencies calculated in step S705 are not 0 (zero), or in other words, if there is a change in the function usage frequencies, in step S706, the department ID indicating the department currently processed and the difference values of the function usage frequencies are added to the department information history table 600 for each receiving date on which the operating information was received.

In step S707, it is determined whether or not the accumulation process has been performed on all of the departments. If it is determined that the accumulation process has been performed on all of the departments, the procedure advances to step S708. If it is determined that the accumulation process has not been performed on all of the departments, the next department is selected as a target to be processed, and the procedure advances to step S705.

For example, in the case where the function usage frequency information indicated in the department information table 550 is received while the department information table 500 is being held, only departments indicated by the department IDs "0001" and "0005" have changes in the function usage frequencies. Accordingly, with respect to the department IDs "0001" and "0005", difference values are added to and stored in the department information history table 600, which can be seen, for example, from the records corresponding to the receiving date "2010/02/25" shown in FIG. 6. On the other hand, departments indicated by the department IDs "0004" and "0600" have the same function usage frequencies (i.e., the difference values are 0), and thus the information regarding these departments is not stored in the department information history table 600. In this manner, the amount of data to be accumulated in the department information history table 600 can be reduced by not storing, in steps S705 and S706, the department information whose function usage frequency information remains the same.

In step S708, the department information management unit 306 updates the department information table held in the latest department information holding unit 302 by deleting the content of the department information table 500, and the process ends.

Figure 8:
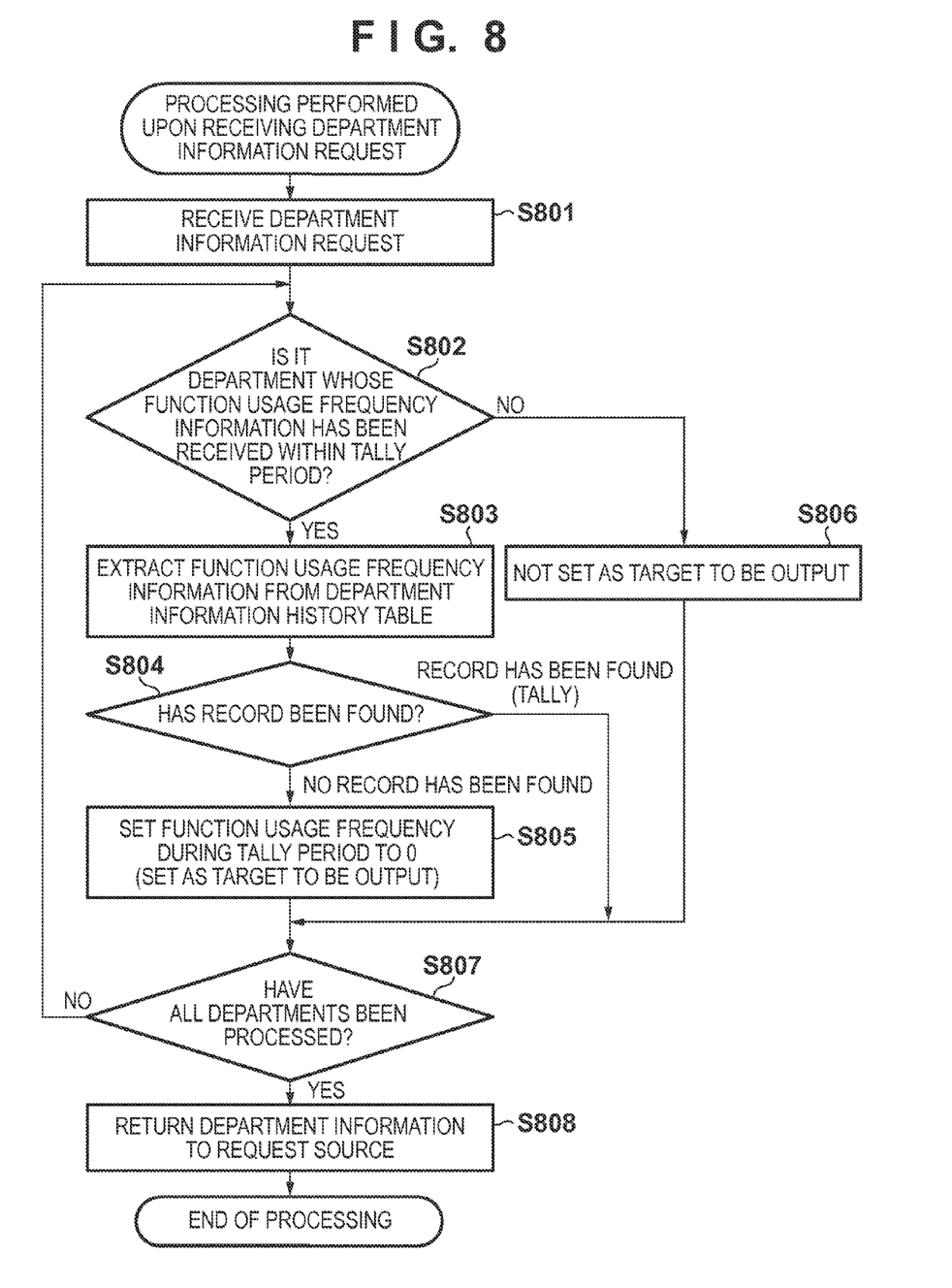
FIG. 8 is a flowchart illustrating processing performed by the management apparatus upon receiving a department information request.

FIG. 8 is a flowchart illustrating processing performed by the management apparatus 110 upon receiving a request for information obtained by tallying up the accumulated function usage frequency information on a department by department basis.

In step S801, the department information request receiving unit 309 receives a request for the department information of the network device 100 from, for example, an external apparatus such as the display apparatus 120 (user apparatus). At this time, the department information request receiving unit 309 accepts designation of a specific period of time (tally period) for which tallying is performed. As used herein, the "department information request" refers to a request for tally information of function usage frequencies tallied for a certain period of time such as a specific month or a specific date. In the request source apparatus, the tally information can be referenced by being displayed using an ordinary web browser or the like.

When the department information request is received, in steps S802 to S806 described below, whether or not to output the function usage frequency information of a department to return the information to the request source is determined for each department.

In step S802, the department determining unit 310 determines whether or not the department is a department whose function usage frequency information has been received within the designated tally period. In other words, if a period of time between the initial receiving date 402 and the final receiving date 403 of each department in the reception management table 400 partially overlaps with the designated tally period, that department is determined as a department for which tallying is to be performed. If it is determined that the department is a department whose function usage frequency information has been received within the designated tally period, the procedure advances to step S803. If it is determined that the department is not a department whose function usage frequency information has been received within the designated tally period, the procedure advances to step S806.

An example will be described in which "2010/02/24 to 2010/02/25" is designated as a tally period while the reception management table 400 is held. In this example, the department indicated by the department ID "0001" has a final receiving date of 2010/02/25 and an initial receiving date of 2009/01/01. That is, the tally period and the receiving period overlap with each other. On the other hand, with the department indicated by the department ID "0002", the tally period and the receiving period do not overlap, from which it can be determined that this department has already been deleted from the network device in the tally period.

In step S803, the department information extraction unit 311 searches the department information history table 600 for the function usage frequency information within the tally period of the department for which tallying is to be performed and extracts the information from the department information history table 600. Then, in step S804, if at least one record of function usage frequency information of the department for which tallying is to be performed within the tally period is extracted in step S803, the department information returning unit 312 references and tallies up the function usage frequencies of the extracted records.

On the other hand, as described in steps S705 and S706, the department information whose function usage frequency remains the same is not stored in the department information history table 600. In this case, in step S805, the department information returning unit 312 determines such a department as a department whose function usage frequencies remain the same within the tally period, and the function usage frequencies are set to zero (0). With this information, it is possible to know that the department has been set in the network device 100, but that the network device was not used by the department within the tally period.

In step S806, the department information returning unit 312 excludes, for example, the department indicated by the department ID "0002" from tallying.

In step S807, it is determined whether or not the process for determining whether to output the tally results of a department has been performed on all of the departments. If it is determined that the determining process has been performed on all of the departments, the procedure advances to step S808. If it is determined that the determining process has not been performed on all of the departments, the next department is selected as a target to be processed, and the procedure advances to step S802.

In step S808, the department information returning unit 312 generates tally results (a fourth table) obtained by extracting and tallying up the function usage frequency information on a department by department basis in steps S803 to S805, and transmits the tally results to the request source (the display apparatus 120). The tally results are displayed on the display apparatus 120.

Figure 9:
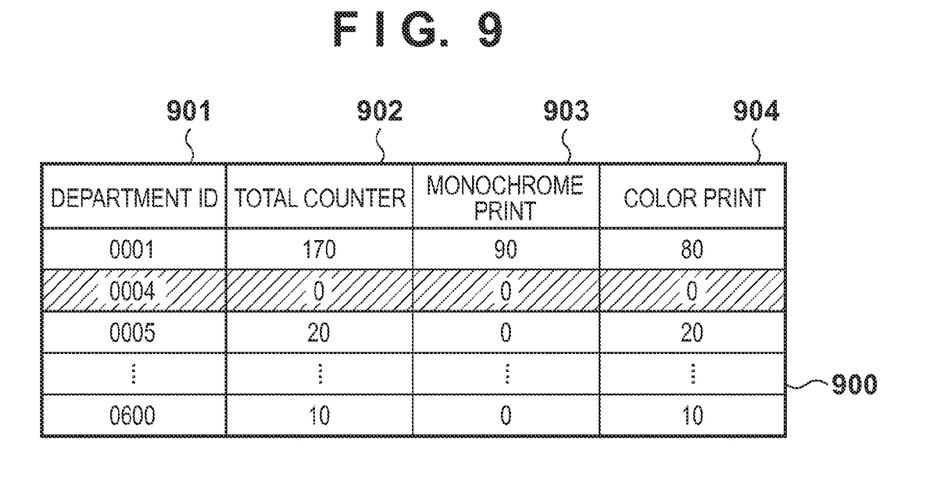
FIG. 9 is a diagram showing an example of function usage frequency information on a department by department basis returned to the request source by the management apparatus.

FIG. 9 is a diagram showing an example of the tally results of the function usage frequency information on a department by department basis that are to be returned by the management apparatus 110 to the request source that requested the department information.

In this example, the department indicated by the department ID "0002" has already been deleted from the network device in the tally period, and thus the records are not output. Moreover, no record regarding the department indicated by the department ID "0004" within the tally period is included in the department information history table 600. However, it can be determined from the table shown in FIG. 4 that the department has been set in the network device 100 within the tally period, and thus 0s are output to the table 900 as function usage frequencies.

As described above, according to the present embodiment, the management apparatus 110 can efficiently manage the operating status information of the network device while maintaining the accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-209885, filed on Sep. 17, 2010, which is hereby incorporated by reference herein in its entirety.

What is claimed is:

1. A management apparatus that acquires operating information from a network device and manages an operating history, the apparatus comprising:
    a determining unit that determines whether the operating information acquired from the network device is usage frequency information for each identifier associated with a user who uses the network device, the usage frequency information being information regarding a function of the network device;
    a storage unit that stores a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier;
    an update unit that, when it is determined by the determining unit that the operating information is the usage frequency information per identifier, updates the first table and the third table using the usage frequency information per identifier and the information indicating the time when the usage frequency information was acquired;
    a receiving unit that receives a request to acquire information for a designated tally period;
    a tally unit that, in response to the acquisition request, tallies up a usage frequency per identifier during the tally period based on the first table and the third table; and
    an output unit that outputs tally results obtained by the tally unit,
    wherein in a case where new usage frequency information per identifier is acquired from the network device, the update unit compares the acquired usage frequency information with the previously acquired usage frequency information per identifier stored in the second table, and performs update by storing, in the third table, usage frequency information of an identifier whose usage frequency has been changed without storing information regarding an identifier whose usage frequency remains the same, and
    even in a case where information regarding an identifier whose usage frequency information has been acquired during the tally period is not stored in the third table with reference to the first table, the tally unit performs tallying so as to include the information regarding the identifier in the tally results.

2. The management apparatus according to claim 1, wherein the update unit deletes the previously acquired usage frequency information per identifier stored in the second table after the tally unit has performed tallying.

3. The management apparatus according to claim 1, wherein the tally unit performs tallying so as to not include, in the tally results, information regarding an identifier whose usage frequency information has not been acquired during the tally period with reference to the first table.

4. The management apparatus according to claim 1, wherein the network device is an image forming apparatus, and
the usage frequency includes the number of print copies by the image forming apparatus.

5. A method of controlling a management apparatus that acquires operating information from a network device and manages an operating history, the method comprising:
determining whether the operating information acquired from the network device is usage frequency information for each identifier associated with a user who uses the network device, the usage frequency information being information regarding a function of the network device;
storing a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier;
updating, when it is determined in the determining step that the operating information is the usage frequency information per identifier, the first table and the third table using the usage frequency information per identifier and the information indicating the time when the usage frequency information was acquired;
receiving a request to acquire information for a designated tally period;
tallying up, in response to the acquisition request, a usage frequency per identifier during the tally period based on the first table and the third table; and
outputting tally results obtained in the tally step,
wherein in the update step, in a case where new usage frequency information per identifier is acquired from the network device, the acquired usage frequency information is compared with the previously acquired usage frequency information per identifier stored in the second table, and update is performed by storing, in the third table, usage frequency information of an identifier whose usage frequency has been changed without storing information regarding an identifier whose usage frequency remains the same, and
in the tally step, even in a case where information regarding an identifier whose usage frequency information has been acquired during the tally period is not stored in the third table with reference to the first table, tallying is performed so as to include the information regarding the identifier in the tally results.

6. A non-transitory computer-readable storage medium storing a program for causing a computer to function as each unit of the management apparatus according to claim 1.

7. An information processing system including a network device, a management apparatus that manages operating information acquired from the network device, and a user apparatus that requests information managed by the management apparatus,
the network device comprising:
a transmitting unit that transmits operating information to the management apparatus,
the management apparatus comprising:
a determining unit that determines whether the operating information acquired from the network device is usage frequency information for each identifier associated with a user who uses the network device, the usage frequency information being information regarding a function of the network device;
a storage unit that stores a first table, a second table and a third table, the first table storing, for each identifier, first information indicating a time when the usage frequency information was first acquired and second information indicating a time when the usage frequency information was last acquired, the second table storing the usage frequency information per identifier acquired from the network device, and the third table storing, as history information, information indicating a time when the usage frequency information per identifier acquired from the network device was acquired as well as the usage frequency information per identifier; and
an update unit that, when it is determined by the determining unit that the operating information is the usage frequency information per identifier, updates the first table and the third table using the usage frequency information per identifier and the information indicating the time when the usage frequency information was acquired, and
the user apparatus comprising:
a request unit that makes a request to acquire information for a designated tally period to the management apparatus; and
a display unit that, in response to the acquisition request, acquires and displays results obtained from the management apparatus tallying up the usage frequency per identifier during the tally period based on the first table and the third table,
wherein in a case where new usage frequency information per identifier is acquired from the network device, the update unit compares the acquired usage frequency information with the previously acquired usage frequency information per identifier stored in the second table, and performs update by storing, in the third table, usage frequency information of an identifier whose usage frequency has been changed without storing information regarding to an identifier whose usage frequency remains the same, and
even in a case where information regarding an identifier whose usage frequency information has been acquired during the tally period is not stored in the third table with reference to the first table, the management apparatus performs tallying so as to include the information regarding the identifier in the tally results.

* * * * *